United States Patent [19]

Cox

[11] Patent Number: 5,745,127
[45] Date of Patent: Apr. 28, 1998

[54] CHART RECORDER TRANSPORT

[75] Inventor: James L. Cox, Charlotte, N.C.

[73] Assignee: Cox Recorders, Belmont, N.C.

[21] Appl. No.: 707,599

[22] Filed: Sep. 5, 1996

[51] Int. Cl.[6] .......................... G01D 15/26; G01D 15/34
[52] U.S. Cl. ........................... 346/136; 346/33 TP
[58] Field of Search ........................ 347/138, 152, 347/170; 346/136, 134, 33 TP; 226/91, 92

[56] References Cited

U.S. PATENT DOCUMENTS

| | | | |
|---|---|---|---|
| 3,710,342 | 1/1973 | Highley, Jr. et al. | 346/136 |
| 3,826,140 | 7/1974 | Nakagawa et al. | 73/343.5 |
| 3,910,119 | 10/1975 | Maxwell | 73/343.5 |
| 3,971,035 | 7/1976 | Maxwell | 346/33 |
| 4,044,362 | 8/1977 | Greenhut | 346/136 |
| 4,074,275 | 2/1978 | Stires, III | 346/19 |
| 4,141,019 | 2/1979 | Johnson | 346/136 |
| 4,222,061 | 9/1980 | Stires, III | 346/145 |
| 4,253,617 | 3/1981 | Nakagawa et al. | 242/55 |
| 4,898,224 | 2/1990 | Woodworth | 160/310 |
| 5,160,944 | 11/1992 | Fukumoto et al. | 346/76 |

*Primary Examiner*—Benjamin R. Fuller
*Assistant Examiner*—Juanita D. Stephens
*Attorney, Agent, or Firm*—Freilich Hornbaker Rosen

[57] ABSTRACT

A chart recorder of simple construction is provided for moving a strip of chart paper past a marker, the recorder providing a final marked chart strip which is not tightly rolled so it can be easily handled and viewed, with the recorder constructed so the marked chart strip can be viewed prior to opening a security-sealed housing. The chart strip (26) has a leading portion (30) connected to a first end (44) of a long string (42), with the second end (46) of the string mounted on a windup drum (52) that is driven by an ordinary clock drive (56). Thus, as the string is slowly wound up, the string pulls the chart strip along the string path. The recorder includes a guide (64) with a wide guide surface (100) that includes a narrow groove portion (102), and with the guide surface extending in a loop (62) of at least about 180°. The housing (12) can be largely transparent so the marked chart can be viewed from outside the housing prior to opening the housing.

12 Claims, 2 Drawing Sheets

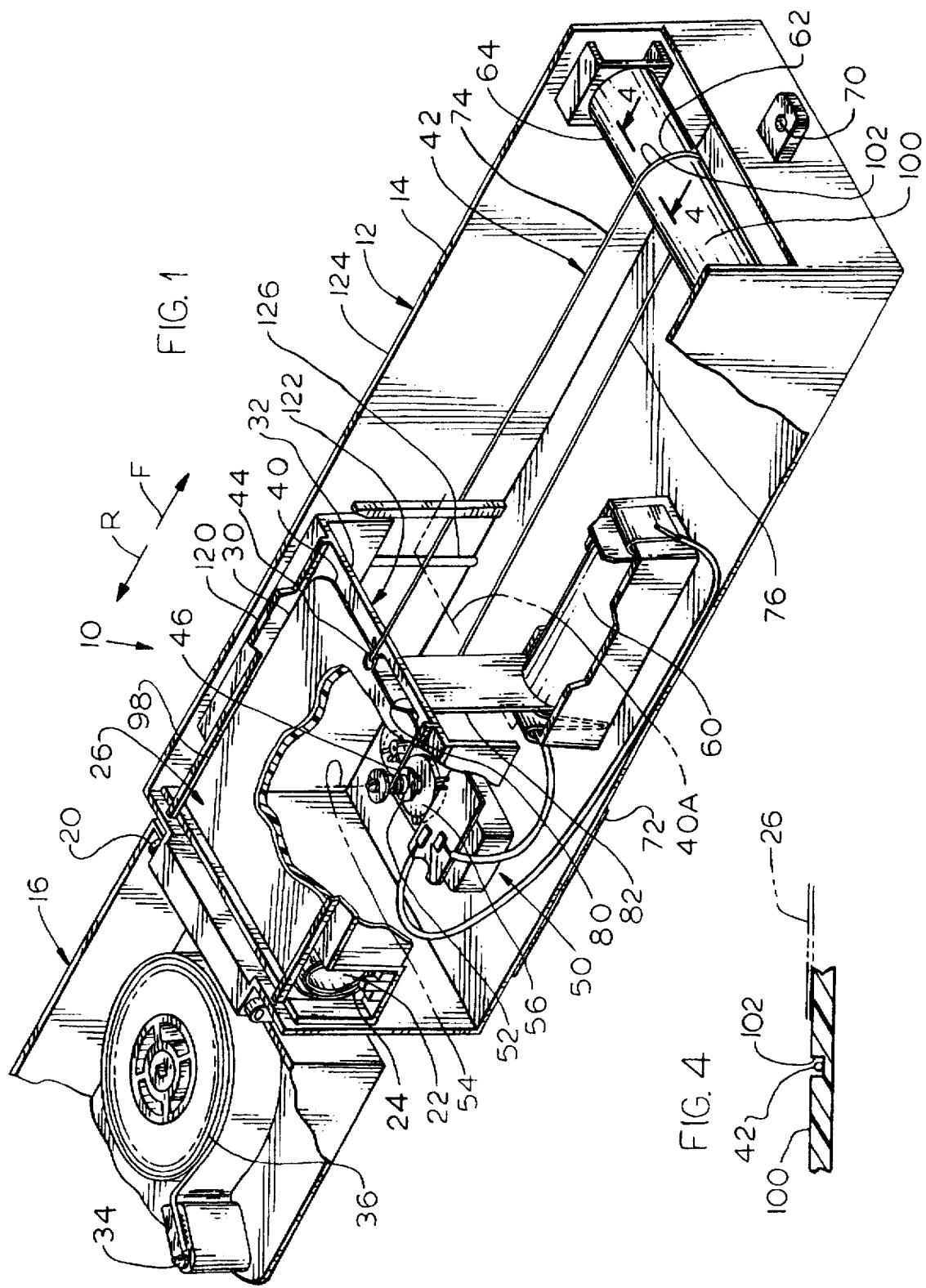

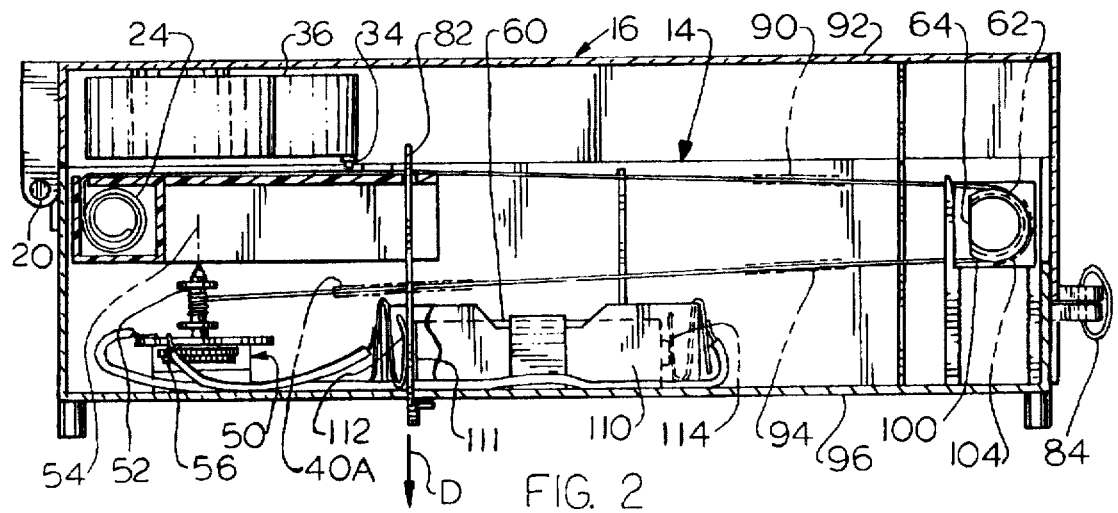
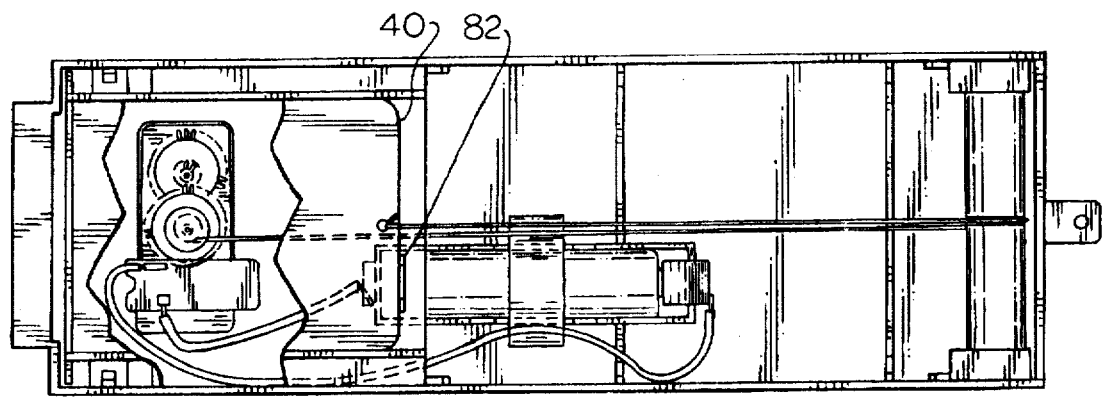
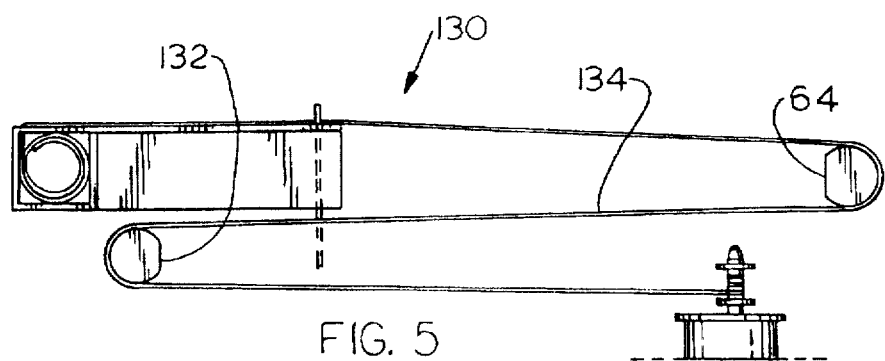

CHART RECORDER TRANSPORT

BACKGROUND OF THE INVENTION

Low cost strip chart recorders are often used to record the temperature of perishable cargo during its transportation. Generally the recorder is contained in a housing with a security seal that is opened by the receiver, or consignee of the cargo. The consignee removes the chart and reviews it to determine whether the shipment has been exposed to a higher-than-permissible temperature during a shipment period of several days. Most chart recorders of this type provide a marked strip of chart paper that is tightly wound onto a takeup roll. The tightly wound chart strip is difficult to handle in order to read the markings.

The carrier often wishes to check the chart prior to turning over the shipment to the consignee, to see if there is potential liability. However, it is generally required that only the consignee break a security seal and remove the chart, to prevent the chart from being switched in the event that the chart records an excessive temperature that will possibly lead to carrier liability for damaged goods. It would often be desirable if the marked long strip of chart paper could be readily viewed by the carrier prior to breaking the security seal and opening the housing of the chart recorder.

SUMMARY OF THE INVENTION.

In accordance with one embodiment of the present invention, a chart recorder is provided which generates a marked strip of chart paper that is relatively easy to handle and read, and which enables viewing of the marked strip prior to opening the housing. The chart recorder includes an elongated strip of chart paper lying primarily at a supply station in the housing, with the strip having a leading portion. A string has one end connected to the leading portion of the chart strip and has an opposite second end coupled to a string pulling mechanism such as windup drum of a clock drive. When the clock drive begins to operate, it slowly winds up the string, while the string pulls the chart strip past a marker to mark it. Most of the length of the string and of the marked portion of the chart paper extends in a limited number of straight lines (e.g. two) with only a small curved portion, which facilitates viewing. The housing can be largely transparent, so the largely straight marked strip can be viewed from outside the housing prior to opening the housing.

A guide mounted in the housing has a guide surface that guides the chart paper in a largely 180° loop. This results in two largely straight lengths of the strip of chart paper, which both can be viewed from outside the transparent housing prior to opening it. The guide surface can be stationary (not a roller) and have a groove portion that guides the string in a looped path prior to the strip reaching the guide surface.

The novel features of the invention are set forth with particularity in the appended claims. The invention will be best understood from the following description when read in conjunction with the accompanying drawings.

BRIEF DESCRIPTION OF THE DRAWINGS

FIG. 1 is an isometric view of a chart recorder of the present invention, showing the strip of chart paper in its initial position, and with part of the housing and of the leading portion of the chart strip being cut away, and with the housing in an open position.

FIG. 2 is a sectional side view of the chart recorder of FIG. 1, with the housing in its closed position.

FIG. 3 is a plan view of the chart recorder of FIG. 2, with the cover removed and part of the strip of chart paper and platen cut away.

FIG. 4 is a view taken on line 4—4 of FIG. 1, showing a portion of the guide.

FIG. 5 is a schematic view of a chart recorder of another embodiment of the invention.

DESCRIPTION OF THE PREFERRED EMBODIMENTS

FIG. 1 illustrates a chart recorder 10 which includes a housing 12 comprising a housing base 14 and a housing cover 16 pivotally connected at a hinge 20 to the base. The housing forms a supply station 22 which holds a roll portion 24 of an elongated strip of chart paper, or chart strip 26. The strip has a leading portion 30 which lies on a platen 32. When the housing cover 16 is closed on the housing base, a stylus 34 of a spiral bimetallic-strip chart marker 36 presses against a strip location near the leading edge 40 of the chart strip. The chart strip shown is a pressure-marked type which displays a mark where concentrated force is applied.

A strip transport includes a long string 42 with a first end 44 connected to the leading portion 30 of the strip. The string has an opposite second end 46 that is coupled to a string pulling mechanism 50. The string pull mechanism 50 includes a drum 52 that can turn about a largely vertical axis 54. The drum 52 is part of a clock drive 56, preferably of an electronic type which is energized by a single AA battery 60. When used as a clock, an hour hand is fixed to the drum. The string extends in a largely 180° loop at 62 around a guide 64, in extension between its opposite ends.

The chart recorder shown in FIG. 1, is in its initial position as supplied by the factory, except that the chart recorder is supplied with the cover 16 closed, and generally with a security seal passing through holes such as 70 in a pair of flanges of the base and cover. At the beginning of a shipment of perishable goods, a form 72 (original and two copies) at the bottom of the housing under the clock drive 56, is filled out and signed, listing the name of the shipper, carrier, and consignee, and with the date and time of the shipment. A separator 82 is then pulled to complete the electric circuit that includes the battery 60, so the clock drive 56 is energized. Typically, the drum 52 turns once every twelve hours, although some common clock drives are provided with drums that turn once every twenty-four hours, and even the minute hand shaft could be used where faster strip movement is desired.

As the drum 52 turns and the string 42 is wound on it, the first end 44 of the string moves in the forward direction F, and drags the leading portion 30 of the chart strip after it, so the strip is slowly pulled past the stylus 34 that marks the strip. The portion of the string extending around the guide 64 reverses direction, so while the upper portion 74 of the string loop moves forward in the direction of arrow F, the bottom portion 76 moves rearward in direction R. When the leading edge 40 of the chart strip reaches the guide 64, the strip moves in a largely 180° loop around the guide, and then the leading edge of the strip starts to move in the rearward direction. The chart recorder is constructed so at the end of a shipment period, the leading edge of the chart strip lies at a position shown at 40A. In one example, the chart recorder is designed to record for a maximum of ten days, and the final position of the leading edge such as at 40A, depends upon the actual period of time, which may be, for example, seven days.

After the transport of the cargo is complete, the carrier may want to view the marked chart strip without opening the safety seal, shown at 84 in FIG. 2. The carrier can view the strip by looking at the upper portion of the chart strip loop at 90 through the largely transparent top wall 92 of the housing, and by looking at the lower portion 94 of the chart strip loop by viewing it through the largely transparent bottom wall 96 of the housing. Both portions of the chart strip loop are part of the chart path 98 which extends from the roll 24 at the supply station. The consignee or receiver of the shipment may first check the safety seal 84 to see that it is intact. He then breaks the seal, opens the housing by pivoting up the cover 16, and removes the chart strip. Even though much of the chart strip was initially rolled into a relatively loose roll at 24, it will be relatively easy to handle and review, because it has been kept largely straight, except for the loop portion at the guide 64, which does not greatly increase the inconvenience in handling, viewing and copying.

Although it is possible to use a guide at 64 which is a rotatably mounted roller, applicant prefers to use a guide which is stationary, but which has a slick surface. As shown in FIG. 4, the slick surface 100 includes a groove portion 102 that receives the string 42 to prevent the string from moving to one side or the other and crinkling the chart paper. FIG. 2 shows that the guide surface 100 extends more than 180°, but that the string loop 62 of the string and then the chart strip loop 104 of the chart strip, is only slightly less than 180°.

A battery compartment 110 which holds the battery 60, has a pair of contacts 112, 114 up through a hole 80 in the platen. The separator 82 lies between a battery terminal 111 and one of the contacts 112. The separator is removed to begin operation of the chart recorder by pulling it downwardly in direction D out of the housing, to allow the battery terminal to engage the battery compartment contact 112. FIG. 3 shows that in the initial position, the leading edge 40 of the chart strip abuts the separator 82. The separator therefore provides a definite starting location where the leading edge of the chart strip lies, at the beginning of operation.

The clock drive 56 is a common type manufactured in very large numbers at low cost, and with the electronics and the gear drive contained in a clock frame of small height and larger width and length when the drum axis 56 is vertical as shown. This facilitates applicant's mounting of the clock drive on the housing of the chart recorder. It is possible to use a spring-powered drive, but an electric clock is preferred.

The platen 32 and supply station 24, along with chart strip edge guide parts 120, are formed as part of a base housing part 122 that can be lowered into the cup-shaped part 124 of the base. The part 122 is supported on ribs 126. The base housing part 122 is preferably installed with the chart strip, installed thereon and with the windup drum 52 turned so the string is under tension to keep it in the groove portion of the guide 64.

In some applications where a much longer chart strip is required, the chart recorder structure shown in FIG. 5 at 130 can be used, wherein an additional loop guide 132 is provided. However, this arrangement results in a middle length 134 of the marked chart being somewhat more difficult to view through a transparent housing.

Although the string 42 may have a round cross-section, it can instead be wider than its thickness, with its width preferably much less than the width of the chart strip and is preferably much less than half of the width of the chart strip. The basic characteristic of the string is that it is a flexible and elongated tension-transmitting member.

Thus, the invention provides a chart recorder that is of relatively simple and low cost construction, which provides a marked chart strip with largely flat portions for easy handling and viewing, and which enables viewing of the marked chart strip prior to opening the housing that contains it. The chart recorder includes a housing with a supply station, an elongated chart strip largely stored at the supply station and having a leading portion, a string pulling mechanism mounted on the housing, and a string extending from the leading portion of the chart strip to the string pulling mechanism. The string pulling mechanism preferably includes a rotatable drum driven by a clock mechanism. As the drum slowly rotates and winds up the string, the string slowly pulls the chart strip past a marker that marks a line on the chart strip. The chart recorder can include a guide that guides the string and then the chart strip in a largely 180° loop. The housing can be largely transparent, so the marked chart strip can be viewed from outside the housing, before the housing is opened.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A chart recorder comprising:

a housing having a supply station;

an elongated chart strip lying primarily at said supply station, said chart strip having a leading portion;

a string pulling mechanism mounted on said housing;

a string coupled to said leading portion of said chart strip and extending to said string pulling mechanism;

said string pulling mechanism being operable to pull said string to thereby pull said strip along a chart strip path that follows said string;

a chart marker located along said chart strip path and having a stylus to mark said strip.

2. The chart recorder described in claim 1 including:

a guide comprising a wall that has a guide surface for guiding said chart strip, with said guide surface extending in at least about a 180° loop to define a loop in said chart strip path, said guide surface constructed to also guide said string in a loop, to thereby first guide said string and then said chart strip in a loop.

3. The chart recorder described in claim 2 wherein:

said guide is stationary against rotation and said guide surface is slick to allow said chart strip to slide around it.

4. The chart recorder described in claim 2 wherein:

said guide surface includes a groove portion that receives said string but not said chart strip.

5. The chart recorder described in claim 1 wherein:

said string pulling mechanism comprises a drum that is rotatable about a drum axis to wind up the string, and apparatus coupled to said drum to turn said drum;

said drum axis is positioned so when said strip leading portion lies in a horizontal plane, said drum axis extends substantially vertically.

6. The chart recorder described in claim 1 wherein:

said string pulling mechanism is constructed to be electrically energized;

said housing includes a platen positioned adjacent to said supply station and opposite said marker to support said chart paper where it is being marked;

in an initial position of said chart recorder prior to energization of said string pulling mechanism said leading portion of said chart strip lies between said platen and said marker with said strip having a leading edge, and with said platen having a slot lying at an initial position of said leading edge; and including a battery compartment mounted on said housing and having a pair of electrical contacts connected to said string pulling mechanism, and including a battery with a pair of battery terminals each lying adjacent to one of said contacts;

a separator lying between a first of said contacts and a first of said terminals to separate them until said separator is pulled out, said separator extending through said slot in said platen and substantially against said strip leading edge in said initial position, to determine the initial position of said chart strip leading edge.

7. The chart recorder described in claim 1 wherein:

said housing is largely transparent at a position opposite said chart strip path, to allow the marked chart strip to be viewed from outside said housing.

8. A chart recorder that includes a housing having a roll storage compartment for storing a roll of chart paper and having a platen for supporting the chart paper, a marker mounted on said housing over said platen, and a strip of chart paper partially lying in a roll in said compartment, said strip having a leading portion extending on said platen and lying under said marker, comprising:

a string pulling mechanism mounted on said housing, said mechanism having a windup drum and apparatus coupled to said drum to turn said drum;

a guide having a curved wall positioned to guide said chart strip in a loop;

a string connected to said leading portion of said strip and extending therefrom in a loop around said guide and to said drum.

9. The chart recorder described in claim 8 wherein:

said curved guide has a wide surface to support substantially the entire width of said chart strip, and said guide has a groove that receives said string.

10. The chart recorder described in claim 8 wherein:

said housing has largely transparent regions;

said string extends in a string path having largely parallel and straight string path portions, and said housing has largely transparent regions for viewing portions of said chart strip at said string path portions.

11. A method for moving a chart strip stored in a housing past a marking station and storing the marked chart strip within said housing, comprising the steps of:

mounting a clock mechanism having a drum, within said housing;

attaching a first end of a string to a leading portion of the chart strip;

attaching a second end of the string to said drum of said clock mechanism, and energizing said clock mechanism to slowly turn said drum to wind said string onto said drum and thereby pull said chart strip past said marking station.

12. The method described in claim 11 comprising the steps of:

guiding said string around a curved surface, in about a 180° loop in passage of the string toward said drum, and pulling said string and then said strip in about 180° loop around said surface.

* * * * *